No. 748,955. PATENTED JAN. 5, 1904.
M. JEWELL.
VEHICLE BRAKE.
APPLICATION FILED APR. 16, 1903.
NO MODEL.

Witnesses
Ricy C. Bowen
M. E. Moore

Inventor
Martin Jewell,
by Wm. N. Moor
Attorney

No. 748,955. Patented January 5, 1904.

UNITED STATES PATENT OFFICE.

MARTIN JEWELL, OF MORRISONS CORNER, MAINE.

VEHICLE-BRAKE.

SPECIFICATION forming part of Letters Patent No. 748,955, dated January 5, 1904.

Application filed April 16, 1903. Serial No. 152,871. (No model.)

*To all whom it may concern:*

Be it known that I, MARTIN JEWELL, a citizen of the United States, residing at Morrisons Corner, in the county of Kennebec and State of Maine, have invented certain new and useful Improvements in Vehicle-Brakes, of which the following is a specification.

My invention relates to improvements in vehicle-brakes, and refers particularly to a brake which will operate automatically to apply the brake-blocks to the wheels when the vehicle is going downhill and to release the brakes when on level ground or ascending a hill.

The object of my invention is the provision of a brake of the character described which will be simple and inexpensive of construction, thoroughly efficient in operation, strong and durable, and entirely practical.

With this object in view my invention consists of an automatic vehicle-brake embodying novel features of construction and combination of parts substantially as disclosed herein.

Figure 1:
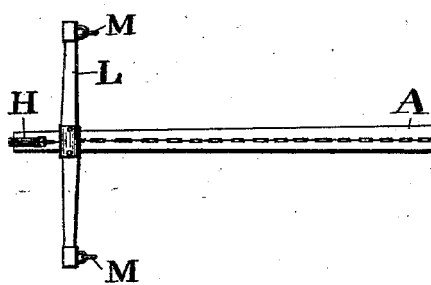
Figure 1:
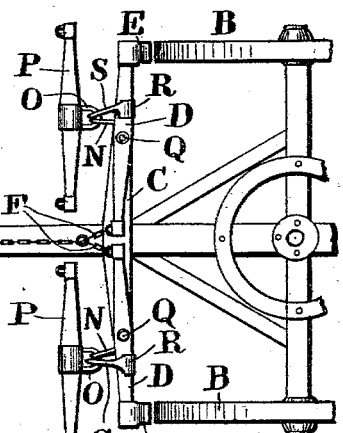
Figure 2:
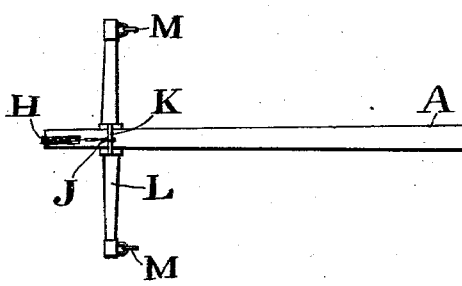
Figure 2:
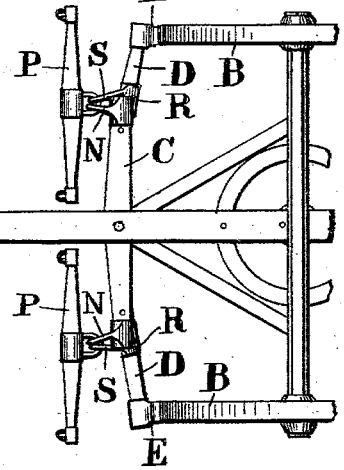
Figure 3:
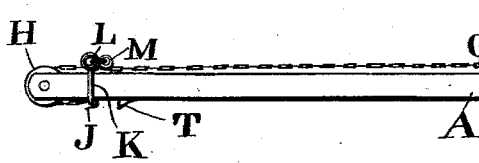
Figure 3:
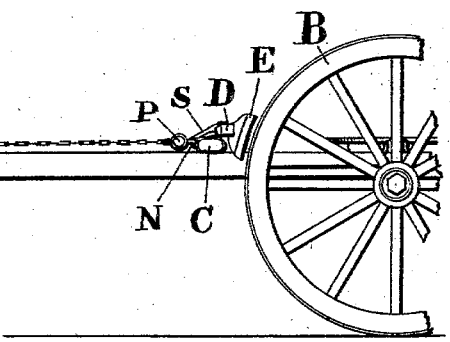

Figure 1 represents a plan view of a vehicle-brake embodying my invention with the parts in the position they occupy when the brakes are not applied. Fig. 2 represents a bottom plan view with the parts in the position they occupy when the brake is applied to the wheel, as in the case of descending the hill; and Fig. 3 represents a side view of my improved brake.

In the drawings the letter A designates the pole of the vehicle. B designates the front wheels, and C designates a cross-piece secured to the pole adjacent to the wheel. Upon the cross-piece near its outer end is pivoted the pair of brake-levers D, carrying at their outer ends the brake-shoes E and at their inner ends connected with the forked portions F of the chain G. This chain extends along the top of the pole, passing over a guide-pulley H, mounted in the outer end of the pole, and has its free end provided with a hook J, which is connected to the bail K, secured to the yoke L, said yoke carrying at each end a hook or loop M for connection with the harness of the horses. To the extreme ends of the cross piece or tree is secured the pair of hooks N, which engage the staples O, carried by the swingletrees P, and to the brake-levers adjacent to their fulcrum-points Q are connected at R the inner ends of the hooks S, the outer ends thereof also engaging the staples carried by the swingletrees.

It will be observed that my brake is particularly adapted for use with two horses and that when the vehicle is being drawn over a level surface or uphill the parts are in the position shown in Fig. 1, with the brake-levers, swingletrees, and yoke in a parallel, and when the vehicle is descending a hill the animals will be drawn back by the driver pulling on the reins, holding the horses back, thus pulling on the chain from the under side, moving the inner end of the brake-levers forward, and forcing the brake-shoes against the rims of the wheels, completely and automatically applying the brakes and preventing a too-rapid descent of the vehicle. It will be noticed that the hooks on the brake-levers and cross-trees will always hold the swingletrees in propor position and that the hooks carried by the brake-levers have a swinging action to enable them to accommodate themselves, and to limit the movement of the yoke and chain I provide the lugs T on the under side of the pole.

I claim—

In a vehicle-brake, the combination of the pole, the cross-tree secured thereto, the hooks connected to the cross-tree, the hooks connected to the brake-levers, the brake-levers fulcrumed to said cross-tree and carrying the brake-shoes at their outer ends, the short chains connected to the inner ends of the brake-levers, the chain connected to the said short chains at the inner end of the brake-levers, the pulley at the outer end of the pole over which the chain passes, the yoke connected to the outer end of the chain and the pair of swingletrees connected to the hooks of the brake-levers and cross-tree and the stop to limit the movement of the yoke.

In testimony whereof I affix my signature in presence of two witnesses.

MARTIN JEWELL.

Witnesses:
 ALBERT CAIN,
 ISAAC BINGHAM.